United States Patent
Hyun et al.

(10) Patent No.: US 10,517,453 B2
(45) Date of Patent: Dec. 31, 2019

(54) DUST COLLECTOR AND VACUUM CLEANER HAVING THE SAME

(71) Applicant: LG ELECTRONICS INC., Seoul (KR)

(72) Inventors: Kietak Hyun, Seoul (KR); Jungmin Ko, Seoul (KR); Soohan Eo, Seoul (KR); Sangchul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 157 days.

(21) Appl. No.: 15/666,761

(22) Filed: Aug. 2, 2017

(65) Prior Publication Data

US 2018/0055317 A1 Mar. 1, 2018

(30) Foreign Application Priority Data

Aug. 25, 2016 (KR) .................. 10-2016-0108423

(51) Int. Cl.
*A47L 5/36* (2006.01)
*A47L 9/16* (2006.01)
(Continued)

(52) U.S. Cl.
CPC ............ *A47L 9/1633* (2013.01); *A47L 5/225* (2013.01); *A47L 5/28* (2013.01); *A47L 5/30* (2013.01);
(Continued)

(58) Field of Classification Search
CPC ...... A47L 9/1633; A47L 9/127; A47L 9/1666; A47L 9/1641; A47L 5/36; A47L 5/28;
(Continued)

(56) References Cited

U.S. PATENT DOCUMENTS 2,671,560 A * 3/1954 Leeman ................... B04C 5/04
                                                    209/728
3,425,192 A * 2/1969 Davis .................... A47L 9/1625
                                                    209/711
(Continued)

FOREIGN PATENT DOCUMENTS

KR          10-0673769         1/2007
KR       10-2007-0067791       6/2007
(Continued)

OTHER PUBLICATIONS

International Search Report dated Jul. 25, 2017 issued in Application No. PCT/KR2017/004707.

*Primary Examiner* — Dung H Bui
(74) *Attorney, Agent, or Firm* — Ked & Associates, LLP

(57) ABSTRACT

A dust cleaner includes a primary cyclone part formed by an outer case and an inner case; and a secondary cyclone part including a set of cyclones. The secondary cyclone part includes a casing member mounted on the inner case and configured to form casings of the cyclones arranged around a hollow part; and vortex finders provided inside the casings and including guide vanes extending in a spiral direction and forming a revolving flow at outer circumferential surfaces. The casing member forms inlet flow paths of the cyclones, and each of the inlet flow paths is formed in a direction inclined with respect to a direction toward a center of each of the vortex finders to enable air to flow in a direction eccentric from the center of each of the vortex finders.

19 Claims, 7 Drawing Sheets

(51) Int. Cl.
   *A47L 5/30* (2006.01)
   *A47L 9/12* (2006.01)
   *B01D 45/14* (2006.01)
   *B04C 3/04* (2006.01)
   *B04C 9/00* (2006.01)
   *A47L 5/22* (2006.01)
   *A47L 5/28* (2006.01)
   *B04C 5/26* (2006.01)
   *B04C 5/28* (2006.01)
   *B04C 3/00* (2006.01)

(52) U.S. Cl.
   CPC ............... *A47L 5/36* (2013.01); *A47L 9/127* (2013.01); *A47L 9/165* (2013.01); *A47L 9/1641* (2013.01); *A47L 9/1666* (2013.01); *A47L 9/1683* (2013.01); *B01D 45/14* (2013.01); *B04C 3/04* (2013.01); *B04C 5/26* (2013.01); *B04C 5/28* (2013.01); *B04C 9/00* (2013.01); *A47L 9/1608* (2013.01); *A47L 9/1625* (2013.01); *A47L 9/1658* (2013.01); *B04C 2003/006* (2013.01); *B04C 2009/004* (2013.01)

(58) Field of Classification Search
   CPC . A47L 5/225; A47L 5/30; A47L 9/165; A47L 9/1683; A47L 9/1608; A47L 9/1625; A47L 9/1658; B01D 45/14; B04C 5/28; B04C 9/00; B04C 3/04; B04C 5/26; B04C 2009/004; B04C 2003/006
   See application file for complete search history.

(56) References Cited

U.S. PATENT DOCUMENTS

| | | | |
|---|---|---|---|
| 7,879,142 B2* | 2/2011 | Han | A47L 9/0081 15/352 |
| 7,955,405 B2* | 6/2011 | Smith | A47L 9/1641 55/345 |
| 2007/0079583 A1* | 4/2007 | Oh | A47L 9/1608 55/345 |
| 2007/0079584 A1* | 4/2007 | Kim | A47L 9/1625 55/345 |
| 2007/0095028 A1* | 5/2007 | Kim | A47L 5/28 55/337 |
| 2007/0095030 A1* | 5/2007 | Oh | A47L 9/1625 55/345 |
| 2007/0144116 A1 | 6/2007 | Hong et al. | |
| 2008/0155947 A1* | 7/2008 | Oh | A47L 9/1625 55/345 |
| 2008/0184893 A1* | 8/2008 | Oh | A47L 9/122 96/416 |
| 2009/0031680 A1* | 2/2009 | Hyun | A47L 9/1625 55/345 |
| 2010/0213118 A1* | 8/2010 | Tandon | B04C 5/04 210/512.2 |
| 2010/0218338 A1 | 9/2010 | McLeod | |
| 2013/0118960 A1* | 5/2013 | Tandon | B01D 21/267 210/95 |
| 2013/0160232 A1* | 6/2013 | Peace | A47L 9/165 15/353 |
| 2016/0206169 A1 | 7/2016 | Hyun et al. | |

FOREIGN PATENT DOCUMENTS

| | | |
|---|---|---|
| KR | 10-2010-0051320 | 5/2010 |
| KR | 10-1622726 | 5/2016 |
| KR | 10-2016-0073820 | 6/2016 |

* cited by examiner

DUST COLLECTOR AND VACUUM CLEANER HAVING THE SAME

CROSS-REFERENCE TO RELATED APPLICATION(S)

Pursuant to 35 U.S.C. § 119(a), this application claims the benefit of earlier filing date and right of priority to Korean Application No. 10-2016-0108423, filed on Aug. 25, 2016, the contents of which is incorporated by reference herein in its entirety.

BACKGROUND

1. Field

The present disclosure relates to a dust collector for a vacuum cleaner that separately collects dust and fine dust from air by using multi-cyclone.

2. Background

A vacuum cleaner is an apparatus for suctioning air by using suction power, separating dust or fine dust included in the air from the air, and discharging clean air. A vacuum cleaner may be classified into 1) a canister type, 2) an upright type, 3) a hand type), 4) a cylinder floor type, etc.

A canister type vacuum cleaner is a vacuum cleaner that is most widely used in homes these days and a vacuum cleaner that communicates a suction nozzle and a main body through a connection member. A canister type is suitable for cleaning a hard floor because the canister type cleaner performs cleaning by only using a suction force. On the other hand, an upright-type vacuum cleaner is a vacuum cleaner having a suction nozzle and a main body formed as one body. Unlike a canister type vacuum cleaner, an upright-type vacuum cleaner may include a rotary brush and thus clean up dust in a carpet. A cyclone used in a vacuum cleaner may be classified into a tangential inflow cyclone (vertical cyclone) and an axial cyclone according to an air flow direction.

A structure of the tangential inflow cyclone can be seen from Korean Patent No. 10-0673769. As described in this patent document, a tangential guide is provided to form a spiral flow for the tangential inflow cyclone. For the tangential inflow cyclone, air flows in a tangential direction through a structure such as a tangential guide, and a spiral flow is formed by a structure for allowing air to flow in a tangential direction. The tangential inflow cyclone has advantages in terms of a simple structure and an easy circular arrangement and thus is suitable for being installed in a restricted space such as a vacuum cleaner. On the other hand, the tangential inflow cyclone has disadvantages in that a large pressure loss occurs due to an eccentric high-speed flow.

A structure of the axial cyclone can be seen from Korean Patent Publication No. 10-2010-0051320. As described in this patent document, a spiral wing is provided to form a spiral flow for the axial cyclone. For the axial cyclone, air flows in an axial direction. The axial cyclone generates a swirling flow using a spiral wing. The axial cyclone has advantages in terms of an appropriate flow rate, uniform suction, and thus a low pressure loss, compared to the tangential inflow cyclone. On the other hand, the axial cyclone has a disadvantage in that it is difficult to produce a guide vane.

Since the tangential inflow cyclone and the axial cyclone have respective advantages and disadvantages, there is a need to require a structure for selectively acquiring only the advantages of the tangential inflow cyclone and the axial cyclone.

The above references are incorporated by reference herein where appropriate for appropriate teachings of additional or alternative details, features and/or technical background.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings.

DETAILED DESCRIPTION

Figure 1:
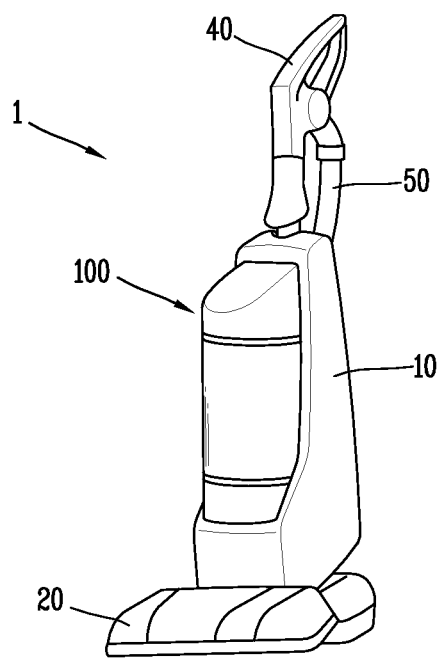
FIG. 1 is a conceptual view showing an example of a vacuum cleaner.
Figure 2:
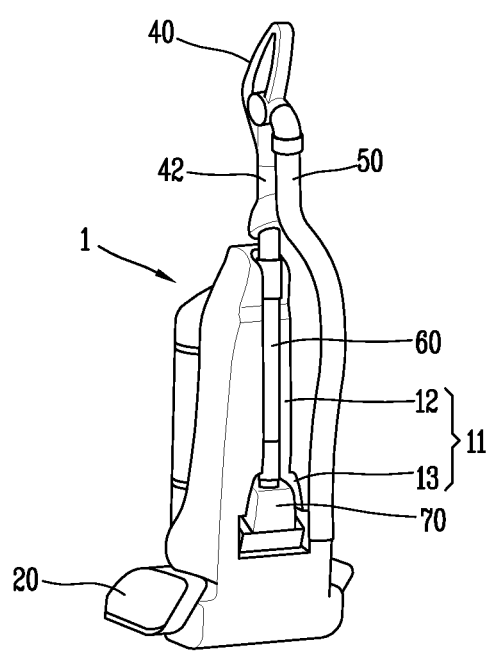
FIG. 2 is a conceptual view of the vacuum cleaner shown in FIG. 1 which is seen in another direction.

FIG. 1 is a conceptual view showing an example of a vacuum cleaner. FIG. 2 is a conceptual view of the vacuum cleaner shown in FIG. 1 which is seen in another direction. A vacuum cleaner 1 shown in FIGS. 1 and 2 corresponds to the upright type.

A main body 10 forms an outer appearance of the vacuum cleaner 1 together with a dust collector 100. The main body 10 may be formed to partially accommodate the dust collector 100 and formed to be combinable with the dust collector 100. A suction motor (not shown) for generating a suction force is provided inside the main body 10. A driving wheel may be installed at the bottom side of the main body 10.

A suction part 20 is connected to the bottom side of the main body 10 rotatably relative to the main body 10 and is configured to support the main body 10. The suction part 20 is put on a floor surface to be cleaned, and a suction hole (not shown) for suctioning dust or air from the floor surface is formed at the bottom surface of the suction part 20.

The suction force generated by the suction motor is transferred to the suction part 20, and air flows into the vacuum cleaner 1 through the suction part 20. An agitator for guiding dust or foreign substances into the suction hole may be rotatably installed inside the suction hole. The air and the foreign substances that have flowed into suction part 20 flow into the dust collector 100 and then are separated from each other by the dust collector 100. The air separated from the foreign substances is discharged from the dust collector 100 through an outlet of the dust collector 100.

As reference, in this specification, the foreign substances included in the air are classified into dust, fine dust, and ultra-fine dust. Relatively large dust is referred to as "dust," relatively small dust is referred to as "fine dust," and dust smaller than "fine dust" is referred to as "ultra-fine dust."

The dust collector 100 is attachable to and detachable from the main body 10. The dust collector 100 is configured to separate the foreign substances from the suctioned air, separately collect the foreign substances, discharge air separated from the foreign substances.

Assistant suction parts 60 and 70 may be removably installed at a rear side of the main body 10. The assistant suction parts 60 and 70 may be provided to clean regions other than the floor surface. The vacuum cleaner 1 may be configured to suction air through the suction part 20 when the assistant suction parts 60 and 70 are coupled to the main body 10 and suction air through the assistant suction parts 60 and 70 when the assistant suction parts 60 and 70 are separated from the main body 10.

Each of the assistant suction parts 60 and 70 includes a suction pipe 60 and a nozzle 70. The nozzle 70 is configured to suction dust that is present in regions other than the floor surface, and the suction pipe 60 is configured to connect the nozzle 70 to a handle 40. Also, an accommodation part 11 for accommodating the suction pipe 60 and the nozzle 70 is formed at the rear side of the main body 10. A suction pipe accommodation part 12 configured to accommodate the suction pipe 60 and a nozzle accommodation part 13 configured to accommodate the nozzle 70 are formed in the accommodation part 11. Thus, it is possible to remove inconvenience caused by separately keeping the nozzle 70.

The handle 40 is provided above the main body 10, and a connection hose 50 may be connected to the handle 40 and the main body 10. The connection hose 50 may form a flow path for enabling dust to flow into the dust collector 100 when the dust flows in through the assistant suction parts 60 and 70. The connection hose 50 may be formed of a flexible material to have an adjustable length and a free movement. A flow path 42 for enabling air suctioned through the nozzle 70 to flow is formed between the handle 40 and the suction pipe 60. Accordingly, air flows into the dust collector through the flow path 42, and the connection hose 50 in sequence when the air flows through the assistant suction parts 60 and 70.

The upright-type vacuum cleaner 1 shown in FIGS. 1 and 2 is just an example of a vacuum cleaner to which the dust collector of the present disclosure is applicable, and thus the present disclosure may be applied to any type of vacuum cleaner other than the upright type.

Figure 3:
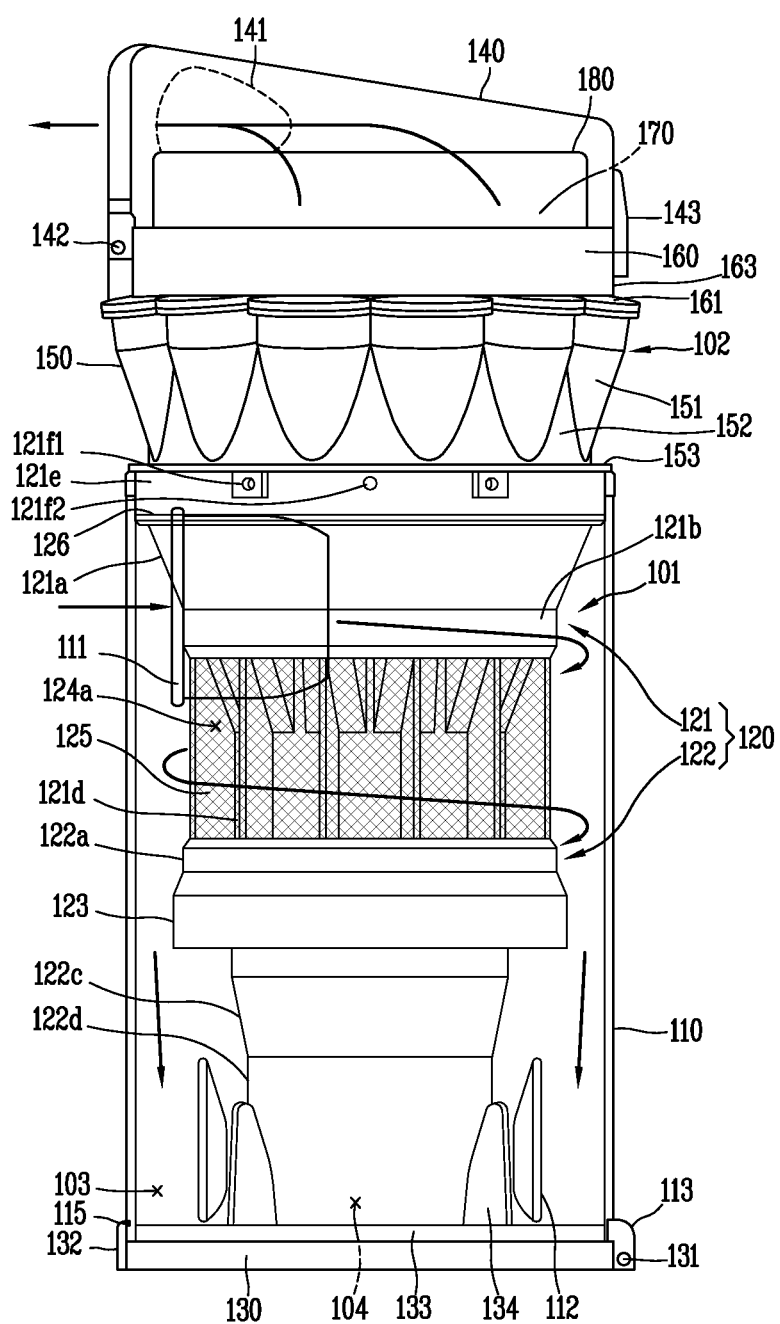
FIG. 3 is a side view of a dust collector of the present disclosure.
Figure 4:
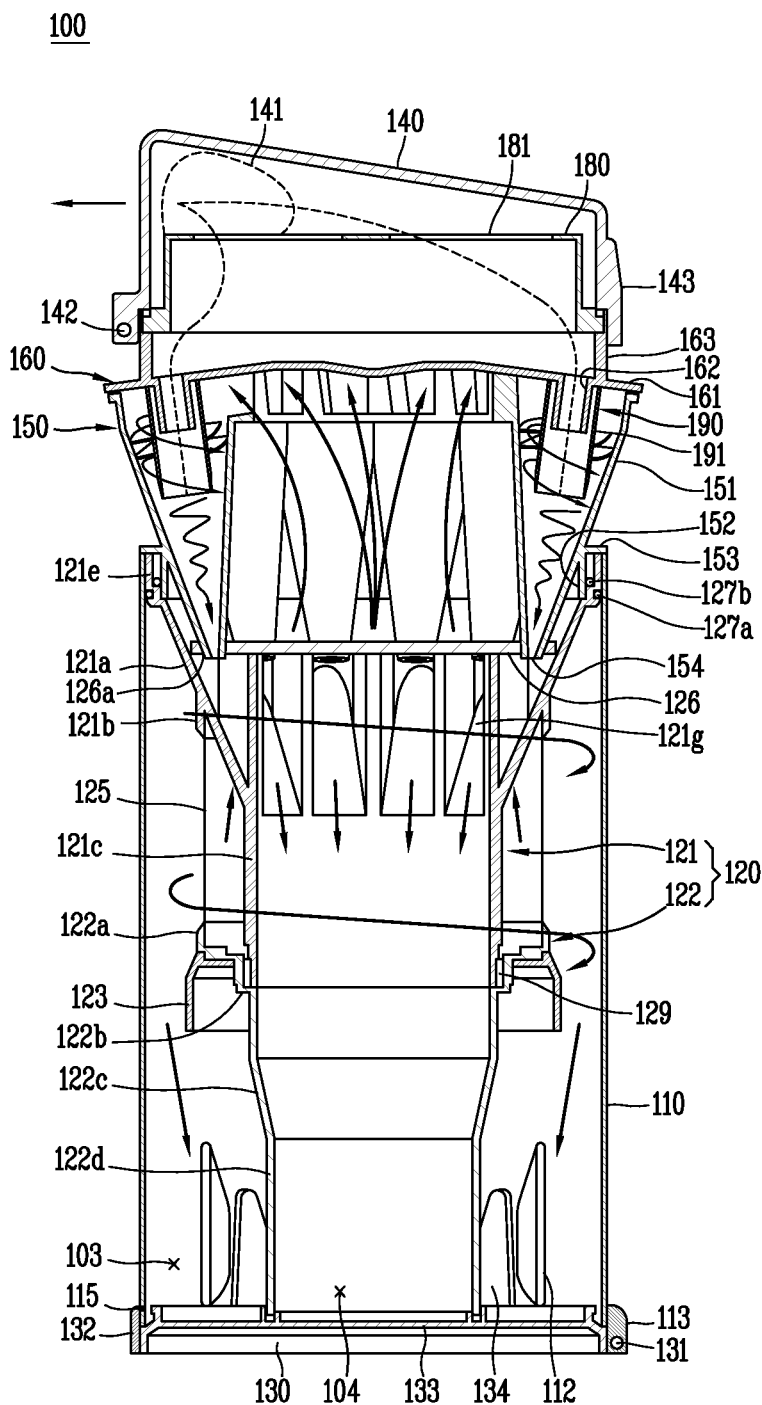
FIG. 4 is a sectional view of the dust collector shown in FIG. 3.
Figure 5:
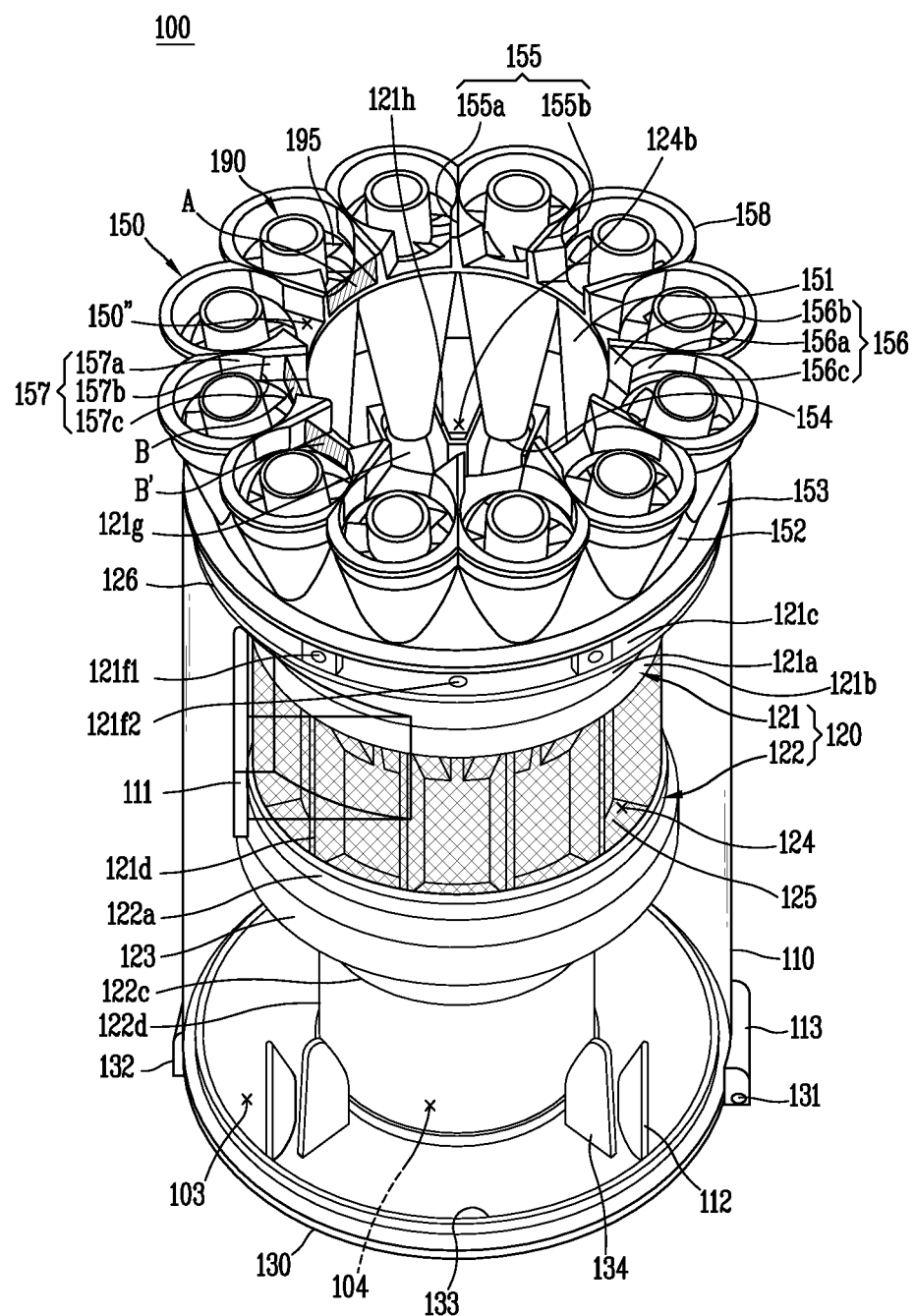
FIG. 5 is a partial perspective view of the dust collector shown in FIG. 3.

The dust collector 100 of the present disclosure will be described below in detail with reference to other drawings. FIG. 3 is a side view of the dust collector 100 of the present disclosure. FIG. 4 is a sectional view of the dust collector 100 shown in FIG. 3. FIG. 5 is a partial perspective view of the dust collector 100 shown in FIG. 3. First, an outer appearance of the dust collector 100 will be described, and then an internal configuration of the dust collector 100 will be described. Since FIG. 3 shows the outer appearance of the dust collector 100, the following description refers to FIG. 3. However, parts that are not shown in FIG. 3 will be described with reference to FIGS. 4 and 5.

The outer appearance of the dust collector 100 is formed by an outer case 110, a lower cover 130, a casing member (or shell casing) 150, a cover member 160, and an upper cover 140. The outer case 110 forms a lateral appearance of the dust collector 100. Also, the outer case 110 has a hollow shape and forms an outer wall of a primary cyclone part (or first cyclone body) 101 to be described below. In order to form a swirling flow in the primary cyclone part 101, it is preferable that the outer case 110 be formed in the shape of a cylinder as shown in FIG. 3. However, since the swirling flow of the primary cyclone part 101 is formed inside the outer case 110, an outer circumferential surface of the outer case 110 does not need to be formed in the shape of a cylinder, unlike an inner circumferential surface of the outer case 110.

An inlet 111 of the dust collector 100 is formed at one side of the outer case 110. Air and foreign substances that have flowed into the vacuum cleaner through the suction part 20 shown in FIGS. 1 and 2 flow along a flow path included in the main body 10 and then flow into the outer case 110 through the inlet 111. The inlet 111 may be formed in a tangential direction of the outer case 110 and may protrude toward the outside of the outer case 110. Such a structure of the inlet 111 is used to create a swirling motion of air and foreign substances. The air and foreign substances that have flowed into the outer case 110 through the inlet 111 in a tangential direction swirl between the outer case 110 and an inner case 120.

Openings may be formed at the top and bottom of the outer case 110. The lower cover 130 is coupled to the bottom of the outer case 110, and an inner case or the casing member 150 is coupled to the top of the outer case 110. The lower cover 130 forms the bottom of the dust collector 100. Here, the bottom includes both of an outer bottom surface and an inner bottom surface of the dust collector 100. The circumference of the lower cover 130 is formed to correspond to the circumference of the outer case 110, and the lower cover 130 is configured to cover the opening formed at the bottom of the outer case 110.

The lower cover 130 is rotatably coupled to the outer case 110 to open or close the opening formed at the bottom of the outer case 110. This embodiment shows that the lower cover 130 is coupled to the outer case 110 by hinges 113 and 131 to open or close the opening formed at the bottom of the outer case 110 by rotating the hinges 113 and 131. However, the present disclosure is not limited thereto, and the lower cover 130 may be detachably coupled to the outer case 110.

The lower cover 130 is kept coupled to the outer case 110 by the hinge 131 and a hook coupling part 132. The hook coupling part 132 is formed opposite to the hinge 131 with respect to the center of the lower cover 130. The hook coupling part 132 is insertable into a groove 115 formed at the outer circumferential surface of the outer case 110. In order to rotate the lower cover 130 by the hinge 131, the hook coupling part 132 should be withdrawn from the groove 115 first.

A first dust collection part 103 and a second dust collection part 104 to be described below are formed inside the dust collector 100, and the lower cover 130 is configured to form a bottom surface of the first dust collection part 103 and the second dust collection part 104. As the lower cover 130 is rotated by the hinge 131, the first dust collection part 103 and the second dust collection part 104 may be simultaneously opened. When the first dust collection part 103 and the second dust collection part 104 are simultaneously opened by the lower cover 130 being rotated by the hinge 131, dust collected by the first dust collection part 103 and fine dust collected by the second dust collection part 104 may be simultaneously discharged. Since dust and fine dust are simultaneously discharged only by a one-time operation of opening the lower cover 130, it is possible to enhance user convenience for the dust collector 100 or the vacuum cleaner.

A sealing member 133 may be coupled around the lower cover 130. The sealing member 133 may be formed in the shape of a ring that surrounds the lower cover 130 and be configured to prevent a leakage of dust or fine dust collected inside the dust collector 100 by sealing a gap between the outer case 110 and the lower cover 130.

The casing member 150 is provided above the outer case 110. The inner case 120 may be installed inside the outer case 110, and the casing member 150 may be coupled to the inner case 120. FIGS. 3 to 5 show such a configuration. Alternatively, the casing member 150 may be directly coupled to the outer case 110.

The casing member 150 is only partially exposed to the outside. The casing member 150 includes casings 151 forming cyclones of a secondary cyclone part (or second cyclone body) 102, a first holding part 152 formed between the casings 151, and a second holding part 153 expanding from the first holding part 152 in a circumferential direction. Only the casings 151, the first holding part 152, and the second holding part 153 are exposed to the outside of the dust collector 100. The casings 151 protrudes in the shape of an inclined semi-cylinder, and the first holding part 152 blocks a gap between the casings 151 to prevent air from leaking through a gap between outer circumferential surfaces of the casings 151. Also, the second holding part 153 is formed to cover the top of the outer case 110. The casing member 150 is originally a structure for forming the secondary cyclone part 102, and a detailed structure of the casing member 150 will be described below in detail.

The cover member 160 is provided above the casing member 150. The cover member 160 is originally configured to form a flow path boundary and a filter installation space and guide air discharged from the secondary cyclone part to an outlet 141 of the dust collector 100. A border 163 of the cover member 160 and a cover part 161 formed along the border 163 are exposed from the outer appearance of the dust collector 100. The cover part 161 is formed along the border 163, and only a semi-cylinder thereof is exposed to the outside of the dust collector 100. The cover part 161 is configured to cover the casings 151.

The upper cover 140 is coupled to an upper portion of the cover member 160 to cover the cover member 160. The circumference of the upper cover 140 corresponds to the circumference of the cover member 160.

The upper cover 140 is provided to face a filter 170 and a filter fixing part 180 mounted on the cover member 160. The upper cover 140 is spaced apart from the filter fixing part 180 to form a discharge path for discharging air discharged from the secondary cyclone part 102 to the outside of the dust collector 100. The outlet 141 of the dust collector 100 is formed at the upper cover 140, and air is discharged to the outside of the dust collector through the outlet 141.

The upper cover 140 may have a tilted surface to ensure a sufficient size of the outlet 141. In order to form a tilted surface on the upper cover 140, a region of the upper cover 140 in which the outlet 141 is formed is spaced relatively far from the filter 170 or the filter fixing part 180, and a region opposite to the outlet 141 is spaced relatively close to the filter 170 or the filter fixing part 180.

The upper cover 140 is rotatably coupled to the cover member 160 to open or close the top of the dust collector 100. This embodiment shows that the upper cover 140 is coupled to the outer case 110 by a hinge 142 to open or close the top of the dust collector 100 by rotating the hinge 142. However, the present disclosure is not limited thereto, and the upper cover 140 may be detachably coupled to the cover member 160.

The upper cover 140 is kept coupled to the outer case 110 by the hinge 142 and a hook coupling part 143. The hook coupling part 143 is formed opposite to the hinge 142 with respect to the center of the upper cover 140. The hook coupling part 143 is insertable into a groove (not shown) formed at the border 163 of the cover member 160, and the hook coupling part 143 should be withdrawn from the groove 115 first in order to rotate the upper cover 140 by the hinge 142.

Next, an internal configuration of the dust collector 100 will be described. The primary cyclone part 101, the secondary cyclone part 102, other elements, and a flow path of the dust collector 100 will be sequentially described for the internal configuration of the dust collector 100.

The primary cyclone part 101 is formed between the outer case 110 and the inner case 120 to separate dust from air flowing in from the outside. A cyclone refers to a device configured to form a swirling flow in air and foreign substances and separate the foreign substances from the air on the basis of a centrifugal force. A foreign substance conceptually includes dust, fine dust, and ultra-fine dust. Air and a foreign substance have different radiuses of revolution due to a centrifugal force because the air and foreign substance have different weights. The cyclone separates foreign substances such as dust and fine dust from air by using a difference in radius of revolution due to a centrifugal force.

The primary cyclone part 101 is formed by the outer case 110, the inner case 120, and a mesh filter 125. The outer case 110 is shaped as a hollow cylinder. The inner circumferential surface of the outer case 110 forms an outer wall of the primary cyclone part 101. Dust larger than fine dust revolves in a swirling flow at a radius greater than that of air or fine dust because the larger dust is heavier than the air or fine dust. The maximum radius of revolution of dust is determined by the inner circumferential surface of the outer case 110 because the dust revolves in a region defined by the inner circumferential surface of the outer case 110.

The inner case 120 is installed inside the outer case 110. Since the primary cyclone part 101 is formed outside the inner case 120, and air and fine dust separated from dust by the primary cyclone part 101 flows into the secondary cyclone part 102 along a flow path of the inner case 120, the inner case 120 forms a boundary between the primary cyclone part 101 and the secondary cyclone part 102. The inner case 120 is provided directly under the casing member 150.

The inner case 120 may be formed by coupling a first member 121 and a second member 122 provided directly under the first member 121. The first member 121 is associated with the primary cyclone part 101, and the second member 122 is associated with the first dust collection part 103 and the second dust collection part 104. Here, the first member 121 will be described first. The following description will be provided with reference to an example in which the inner case 120 is formed by coupling the first member 121 and the second member 122. However, the present disclosure is not limited thereto. For example, the inner case 120 may be formed with only one member.

The first member 121 includes an inclined part 121a, an upper support part 121b, a vertical extension part 121c, a bridge 121d, an upper boundary part 121e, a first coupling part 121f1, and a second coupling part 121f2. The first member 121 may further include an inclined surface 121g and a boundary wall 121h. The inclined surface 121g and the boundary wall 121h will be described later.

The inclined part 121a has a shape similar to a funnel. The inclined part 121a is obliquely formed to have a sectional area that progressively widens upward and narrows downward. The inclined part 121a is spaced apart from the inner circumferential surface of the inner case 120. The inclined part 121a progressively approaches the inner circumferential surface of the outer case 110 upward and recedes from the inner circumferential surface of the outer case 110 downward. The inclined part 121a is obliquely formed to form the inclined surface 121g on the inner circumferential surface and induce fine dust separated from the secondary cyclone part 102 to naturally fall down. The inclined surface 121g is shown in FIGS. 4 and 5.

The upper support part 121b protrudes downward from a center part of the inclined part 121a. The upper support part 121b has a circular cross section because the upper support part 121b is formed around the inclined part 121a. The upper support part 121b is provided to face a lower support part 122a of the second member 122. A mesh filter 125 is installed between the upper support part 121b and the lower support part 122a to filter out dust, and the upper support part 121b and the lower support part 122a are configured to support the mesh filter 125 at the top and bottom of the mesh filter 125, respectively.

The vertical extension part 121c extends downward from the bottom of the inclined part 121a. The vertical extension part 121c is named because the vertical extension part 121c extends in a vertical direction when the dust collector 100 is placed on a flat surface. However, the direction of the vertical extension part 121c should not be limited to the vertical direction.

The vertical extension part 121c has a hollow cylindrical shape. The vertical extension part 121c is supported by the second member 122. Fine dust separated from the secondary cyclone part 102 is collected by the second dust collection part 104 through a region formed by the vertical extension part 121c. Additionally, a sealing member 129 for preventing a leakage of fine dust collected by the second dust collection part 104 may be installed between the vertical extension part 121c and the second member 122.

The bridge 121d protrudes from an outer circumferential surface of the vertical extension part 121c in a circumferential direction and extends in a vertical direction like the vertical extension part 121c. The bridge 121d is brought in contact with the mesh filter 125 to support the mesh filter 125 between the upper support part 121b and the lower support part 122a.

The bridge 121d may be provided in plural, and a plurality of bridges 121d may be spaced apart from each other along the outer circumferential surface of the vertical extension part 121c. Thus, a connection flow path 124a through which air and fine dust separated from dust by the primary cyclone part 101 may flow into the secondary cyclone part 102 is formed between the bridges 121d.

The upper boundary part 121e is provided above the inclined part 121a. The upper boundary part 121e has a circular cross section because the upper boundary part 121e is formed along and in contact with the inner circumferential surface of the outer case 110. An outer surface of the upper boundary part 121e is in contact with the inner circumferential surface of the outer case 110. Since the inner side and the outer side of the outer case 110 are separated from each other by the upper boundary part 121e, the upper boundary part 121e forms a boundary between the inside and the outside of the outer case 110.

A sealing member 127a is coupled to an outer circumferential surface of the upper boundary part 121e. The sealing member 127a may have the shape of an O-ring. The sealing member 127a is configured to pr(or leading boundary part or wall) starevent air or foreign substances from leaking through a gap between the outer case 110 and the upper boundary part 121e. The upper boundary part 121e may include a recess part (not shown) that forms an installation region of the sealing member 127a, and the recess part is formed along the outer circumferential surface of the upper boundary part 121e.

The upper boundary part 121e is coupled to the outer case 110 and the casing member 150. The first coupling part 121f1 is formed on the outer circumferential surface of the upper boundary part 121e and coupled to the outer case 110, and the second coupling part 121f2 is formed on the outer circumferential surface of the upper boundary part 121e and coupled to the casing member 150.

Referring to FIGS. 3 and 5, the first coupling part 121f1 is provided in plural, and a plurality of first coupling parts 121f1 are spaced apart from each other along the outer circumferential surface of the upper boundary part 121e. The first coupling part 121f1 is formed in the shape of "c," and the top of the outer case 110 is inserted into an opening in the shape "c." A screw fastening hole is formed in the first coupling part 121f1, and a screw fastening hole corresponding to the screw fastening hole formed in the first coupling part 121f1 is formed at the top of the outer case 110. Thus, when a screw is inserted into the two screw fastening holes, the outer case 110 is coupled to the first member 121.

The second coupling part 121f2 is provided in plural, and a plurality of second coupling parts 121f2 are spaced apart from each other along the outer circumferential surface of the upper boundary part 121e. The plurality of first coupling parts 121f1 and the plurality of second coupling parts 121f2 may be arranged alternately. The alternate arrangement denotes that a second coupling part 121f2 is provided next to a first coupling part 121f1 and another first coupling part 121f1 is provided next to the second coupling part 121f2 in turn repeatedly. The second coupling part 121f2a may be composed of only a screw fastening hole. Referring to FIG. 4, the casing member 150 includes the second holding part 153 to be described below, and a screw fastening hole corresponding to a screw fastening hole of the second coupling part 121f2 is formed in the second holding part 153. Thus, when a screw is inserted into the two screw fastening holes, the casing member 150 is coupled to the first member 121.

The mesh filter 125 is installed between the upper support part 121b of the first member 121 and the lower support part 122a of the second member 122. An upper portion of the mesh filter 125 is supported by the upper support part 121b, a lower portion of the mesh filter 125 is supported by the lower support part 122a, and an inner portion of the mesh filter 125 is supported by the bridge 121d that has been described above. Generally, the mesh filter 125 may have a hollow cylindrical shape. An outer portion of the mesh filter 125 faces the inner circumferential surface of the outer case 110 at a position spaced apart from the inner circumferential surface of the outer case 110.

The mesh filter 125 may have a mesh form or a porous form to separate dust from air. The air flows from the outer portion of the mesh filter 125 to the inner portion, and foreign substances that are smaller than a hole of the mesh filter 125 are separated from the air by the mesh filter 125. Because of a cyclone property in which foreign substances are separated from air on the basis of a centrifugal force, it is theoretically impossible that light foreign substances are separated from air by the primary cyclone part 101. However, when foreign substances are light but larger than the hole of the mesh filter 125, the foreign substances are separated from air by the mesh filter 125.

The configuration of the primary cyclone part 101 has been described, and the first dust collection part 103 will be described below. The first dust collection part 103 is formed to collect dust separated from air by the primary cyclone part 101. The first dust collection part 103 indicates a space that is defined by the outer case 110, the second member 122 of the inner case 120, a skirt 123, and the lower cover 130. Each of the elements will be described below.

A flow prevention part 112 may be formed in the inner circumferential surface of the outer case 110. The flow prevention part 112 protrudes from the inner circumferential surface of the outer case 110 to prevent any flow of dust collected by the first dust collection part 103.

The second member 122 is provided under the first member 121. The second member 122 includes the lower support part 122a, a stepped part 122b, a dust collection part boundary 122d, and an inclined part 122c. As described above, the lower support part 122a is an element that is formed on the top of the second member 122 and configured to support the mesh filter 125 together with the upper support part 121b of the first member 121. The other elements will be described below.

The stepped part 122b is shown in FIG. 4. The stepped part 122b is provided in contact with the bottom of the vertical extension part 121c of the first member 121 and configured to support the bottom of the vertical extension part 121c. Thus, the first member 121 may be supported by the second member 122.

The stepped part 122b may form steps to fix a position of the first member 121. The steps may be continuously formed in a first vertical direction in which the stepped part 122b is connected to the lower support part 122a, a horizontal direction in which the stepped part 122b supports the vertical extension part 121c, and a second vertical direction in which the stepped part 122b is connected to the inclined part 122c. Thus, the first member 121 may be fixed at a predetermined position without moving in the horizontal direction by a step structure formed by the stepped part 122b.

A boundary between the first member 121 and the second member 122 is formed between the vertical extension part 121c of the first member and the stepped part 122b of the second member 122. Thus, fine dust collected by the second dust collection part 104 may leak through the boundary. In order to the leakage of fine dust, the sealing member 129 may be installed in the outer circumferential surface of the vertical extension part 121c. The sealing member 129 may have the shape of an O-ring and may be provided between a part corresponding to the first vertical direction and the vertical extension part 121c. As shown in FIG. 4, a step structure may also be formed at the bottom of the vertical extension part 121c in order to couple the sealing member 129 thereto.

The inclined part 122c may be formed below a part corresponding to the second vertical direction. The inclined part 122c has a shape similar to a funnel like the inclined part 121a of the first member 121. The inclined part 122c is obliquely formed to have a sectional area that progressively widens upward and narrows downward. The inclined part 122c is spaced apart from the inner circumferential surface of the inner case 120. The inclined part 121a progressively approaches the inner circumferential surface of the outer case 110 upward and recedes from the inner circumferential surface of the outer case 110 downward.

The inclined part 122c is obliquely formed to form the inclined surface 121g on the inner circumferential surface and induce fine dust separated from the secondary cyclone part 102 to naturally fall down. The inclined surface 121g is shown in FIG. 4.

The dust collection part boundary 122d is formed in the shape of a hollow cylinder or a hollow polygonal column and extends from the bottom of the inclined part 122c to the lower cover 130. The dust collection part boundary 122d forms a boundary between the first dust collection part 103 and the second dust collection part 104. The outside of the dust collection part boundary 122d corresponds to the first dust collection part 103, and the inside of the dust collection part boundary 122d corresponds to the second dust collection part 104. Dust separated from air by the primary cyclone part 101 is collected by the first dust collection part 103, and fine dust separated from air by the secondary cyclone part 102 is collected by the second dust collection part 104.

The skirt 123 is coupled to a border of the second member 122. FIG. 4 shows that the second member 122 is connected with the lower support part 122a or connected to the part corresponding to the first vertical direction. The skirt 123 is configured to prevent the dust collected by the first dust collection part 103 from being scattered. Here, scattering refers to a phenomenon in which dust go up from the first dust collection part 103 back to the primary cyclone part 101, etc. The skirt 123 may have a structure that expands from an outer circumferential surface of the second member 122 to the inner circumferential surface of the inner case 120 in a circumferential direction and then extends toward the lower cover 130. Also, the skirt 123 may have a slope while expanding in the circumferential direction.

A flow prevention part 134 may also be formed in the lower cover 130. The flow prevention part 134 protrudes from an inner bottom surface to prevent any flow of the dust collected by the first dust collection part 103. In particular, as shown in FIG. 5, the flow prevention part 134 of the lower cover 130 may be paired with the flow prevention part 112 of the outer case 110 to divide the first dust collection part 103 into a plurality of regions. Thus, it is difficult for dust collected by the first dust collection part 103 to pass over adjacent regions because the dust is blocked by a wall formed by the two flow prevention parts 112 and 134.

As described above, the first dust collection part 103 may be defined and formed by the skirt 123, which forms an upper wall, the outer case 110, which forms an outer wall, the dust collection part boundary 122d, which forms an inner wall, and the lower cover 130, which forms a bottom.

The first dust collection part 103 has been described above, and the secondary cyclone part 102 will be described below. However, since air having passed through the primary cyclone part 101 flows into the secondary cyclone part 102 through the connection flow paths 124a and 124b, the connection flow paths 124a and 124b will be described first. The connection flow paths 124a and 124b refer to flow paths for connecting the primary cyclone part 101 with the secondary cyclone part 102.

When dust is separated from air by the primary cyclone part 101, air and fine dust flow into the secondary cyclone part 102 along the connection flow paths 124a and 124b. As described above, the connection flow path 124a, which is one of the connection flow paths 124a and 124b, is formed between the bridges 121d that are separated from each other. Also, referring to FIG. 5, the first member 121 includes boundary walls 121*h* for partitioning inclined surfaces 121*g*, and the connection flow path 124*b* is formed between two boundary walls 121*h* that are adjacent to each other through the connection flow path 124*a* that has been described above.

Referring to FIG. 5, the boundary walls 121*h* may be formed to surround a fine dust vent 154 and may have a cross section similar to a saw-toothed wheel to form the connection flow paths between the casings 151. For example, it may be understood that the boundary walls 121*h* form a concave-convex pattern in the horizontal direction.

In order to prevent dust passing through the connection flow path 124*b* and fine dust discharged from the fine dust vent 154 from mixing with each other, a partition plate 126 may be installed at an upper side of the first member 121. The partition plate 126 is shown in FIG. 4, but its detailed shape may be inferred from a structure of FIG. 5.

The partition plate 126 includes a plurality of holes configured to accommodate fine dust vents 154 of the casings 151, and the casings 151 are held in the holes. Also, the partition plate 126 has a shape corresponding to the boundary wall 121*h*. For example, the partition plate 126 has a concave-convex pattern at an outside thereof in the horizontal direction and has a cross section similar to a saw-toothed wheel. Accordingly, the partition plate 126 does not block the connection flow path 124*b* between the boundary walls 121*h*, but blocks the other regions.

When the partition plate 126 is installed, fine dust discharged from the fine dust vent 154 falls down along the inclined surface 121*f* and is collected by the second dust collection part 104 and cannot go up. This is because a region to which the fine dust may go up is blocked by the partition plate 126. Unlike this, since the connection flow path 124*b* between the boundary walls 121*h* is not blocked, air and fine dust having passed through the primary cyclone part 101 go up through the connection flow path 124*b* and then flow into the secondary cyclone part 102. Accordingly, a hollow part (or hollow region) 150' of the casing member 150 above the partition plate 126 corresponds to a connection flow path for connecting the primary cyclone part 101 and the secondary cyclone part 102.

The secondary cyclone part 102 is a set of cyclones for separating fine dust from air having passed through the primary cyclone part 101. In the present disclosure, the secondary cyclone part 102 is provided above the primary cyclone part 101. Also, the secondary cyclone part 102 is provided outside the primary cyclone part 101.

The secondary cyclone part 102 is formed by the casing member 150 and a vortex finder 190. The cover member 160 may be additionally included as an element of the secondary cyclone part 102. The above elements will be sequentially described below. However, an inlet flow path 150" of the casing member 150 will be described later with reference to FIG. 6.

Figure 6:
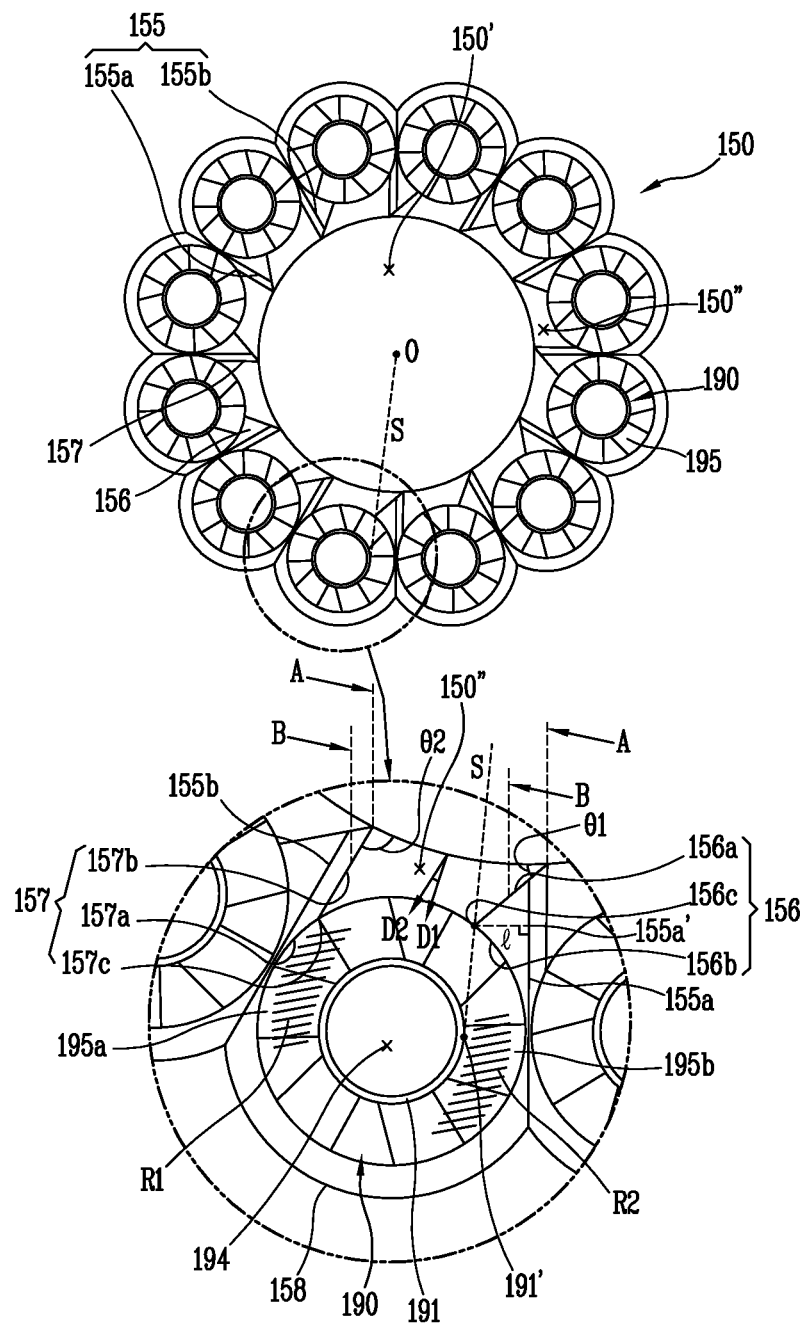
FIG. 6 is a plan view of a casing member and a vortex finder.

Referring to FIG. 6, the casing member 150 includes a hollow part 150'. Also, the cyclones of the secondary cyclone part 102 are arranged around the hollow part 150'. In particular, FIG. 6 shows a configuration in which the cyclones are arranged around the hollow part 150' to sequentially come in contact with each other.

The casing member 150 forms casings 151 of the cyclones. As described above, the primary cyclone part 101 is formed by the outer case 110 and the inner case 120 to generate a swirling flow in a region between the outer case 110 and the inner case 120. Similarly, the cyclones of the secondary cyclone part 102 generate a swirling flow in a region between the casing 151 and the vortex finder 190 to be described below. The casing 151 corresponds to the outer case 110, and the vortex finder 190 corresponds to the inner case 120.

The casings 151 are sequentially arranged in contact with each other to form a circular shape. Accordingly, it may be understood that the casings 151 are collected together to form a single casing member 150. The inner space of the circular shape corresponds to the hollow part 150' of the casing member 150 that has been described above.

Directions of the primary cyclone part 101 and the secondary cyclone part 102 may be defined according to several criteria. As one of the criterion, the directions are set based on a direction of a central axis of revolution of the swirling flow. For example, the swirling flow of the primary cyclone part 101 revolves around a central axis of revolution that is in a vertical direction (or in an up-and-down direction). Accordingly, the direction of revolution of the primary cyclone part 101 is the vertical direction. When the criterion of the present disclosure is applied, the direction of the secondary cyclone part 102 is defined as a direction that is inclined from, not parallel to, the direction of the primary cyclone part 101. As shown in FIG. 4, this is because the central axis of revolution of the swirling flow formed by the secondary cyclone part 102 forms an acute angle from the central axis of revolution of the swirling flow formed by the primary cyclone part 101.

Also, when the criterion is applied to the casing 151, the casing 151 is also inclined from the direction of the primary cyclone part 101. It can be seen from FIG. 4 that the casing 151 is inclined. The casing 151 forms an outer wall surrounding a hollow part. The outer wall surrounding the hollow part formed by the casing 151 corresponds to the outer wall of each of the cyclones. However, the hollow part should be distinguished from the hollow part of the casing member 150. Fine dust heavier than air revolves at a radius greater than that of the air in a swirling path. The maximum radius of revolution of the fine dust is defined by the casing 151 because the fine dust revolves in a region defined by the casing 151.

A lower portion of the casing 151 may have an inclined shape that progressively narrows downward. For example, the casing 151 has a cross section that progressively narrows downward. The lower portion of the casing 151 having a shape that progressively narrows downward is for inducing fine dust separated from air to fall down and also for preventing the fine dust from being discharged to the vortex finder 190 together with the air.

The casing member 150 is mounted on the inner case 120. FIG. 4 shows a configuration in which the casing member 150 is mounted on the first member 121. The casing member 150 includes the first holding part 152 so that the casing member 150 may be mounted on the inner case 120.

The first holding part 152 is formed between the casings 151. Although the casings are sequentially arranged in contact with each other, the casings are partially spaced apart from each other. This is because the casings have a shape that progressively narrows downward. The first holding part 152 is formed to block a region between the casings 151. The first holding part 152 has a shape that progressively widens downward to block the region between the casings 151. The shape can be seen from FIGS. 3 and 5. The first holding part 152 is partially exposed to the outside of the dust collector 100 and partially blocked by the first member 121. FIGS. 3 and 5 show a portion of the first holding part 152 that is visually exposed to the outside of dust collector 100, and FIG. 4 shows another part accommodated in the first member 121.

The first holding part 152 extends vertically. Referring to FIG. 4, it may be understood that the first holding part 152 protrudes from an outer circumferential surface of the casing 151. The first member 121 forms steps between the upper boundary part 121e and the inclined part 121a along the circumference thereof, and the first holding part 152 is mounted on the steps along the circular shape. A sealing member 127b may be installed between the first holding part 152 and the first member 121 in order to prevent a leakage of air or foreign substances. The sealing member 127b may have the shape of an O-ring corresponding to the circumference of the first holding part 152.

The casing member 150 is also mounted on the partition plate 126. As described above, the partition plate 126 includes several holes corresponding to fine dust vents 154 of the cyclones. Each of the fine dust vents 154 is formed at the bottom of the casing 151, and the bottom of the casing 151 is inserted into the hole. Thus, an outer circumferential surface of the casing 151 is supported by the partition plate 126, and the fine dust vent 154 is provided below the partition plate 126. Since the fine dust vent 154 is provided below the partition plate 126, it is possible to block dust discharged through the fine dust vent 154 from going up to an inlet of each of the cyclones.

The casing member 150 is also mounted on the outer case 110. The casing member 150 includes the second holding part 153, and the second holding part 153 is formed to protrude or expand from the second holding part 153 in a circumferential direction. The second holding part 153 may have substantially the same size as the circumference of the outer case 110 within a tolerance range. The second holding part 153 is formed to cover the top of the outer case 110. As the second holding part 153 is mounted on the top of the outer case 110, the casing member 150 is mounted on the outer case 110. A sealing member (not shown) may be installed between the second holding part 153 and the outer case 110, but this is not essential. This is because the sealing member 127a has been already installed between the upper boundary part 121e and the outer case 110.

The vortex finder 190 may be provided equal to the number of casings 151, and the same number of vortex finders 190 are provided inside the casings 151. The vortex finders 190 may be surrounded by the casings 151 and spaced apart from inner circumferential surfaces of the casings 151. One of the vortex finders 190 forms one cyclone together with one of the casings 151. When a plurality of cyclones are collected to form a set thereof, the secondary cyclone part 102 is formed.

The vortex finder 190 may be formed to have a diameter that progressively shortens downward. When an upper portion of the vortex finder 190 has a relatively large diameter, a flow rate may increase because a space between an inner circumferential surface of the vortex finder 190 and an inner circumferential surface of the casing 151 narrows. Also, when the upper portion of the vortex finder 190 has a relatively large diameter, it is possible to reduce a flow path loss. When a lower portion of the vortex finder 190 has a relatively small diameter, it is possible to block fine dust that should have been discharged to the fine dust vent 154 from flowing into the vortex finder 190. This is because the range of a centrifugal force decreases.

The vortex finder 190 includes a guide vane 195 that generates a revolving flow (a swirling flow). The guide vane 195 may be provided in plural at the outer circumferential surface of the vortex finder 190, and a plurality of guide vanes 195 extend in a spiral direction. Since the guide vane 195 extends in the spiral direction, the revolving flow is also formed in the spiral direction along the guide vane 195. In FIG. 4, the swirling flow is shown as an arrow.

When a swirling flow is formed between the inner circumferential surface of the casing 151 and the outer circumferential surface of the vortex finder 190 by the guide vane 195, fine dust is separated from air. The vortex finder vane 190 is configured to discharge the air from which the fine dust is separated. The vortex finder 190 has a structure that forms an outer wall surrounding a hollow part 194, and the hollow part 194 that is described herein corresponds to a flow path through which the air from which the fine dust is separated is discharged, and should be distinguished from the above-described several hollow parts. In FIG. 4, the discharge of air is indicated as a dotted line.

The cover member 160 includes the cover part 161, an air discharge part 162, and the border 163. As described above, the border 163 is a region exposed from the outer appearance of the dust collector 100. The cover part 161 is formed to cover the casing member 150 and the vortex finder 190. Thus, the cover part 161 forms a flow path boundary. When the cover part 161 is not present, air and fine dust that have passed through the primary cyclone part 101 moves in a direction toward the outlet 141 of the dust collector 100. However, since the cover part 161 is configured to cover the casing member 150 and the vortex finder 190, the air and fine dust may flow into the inlet flow path 150" of the cyclones.

Only a semi-circular part out of a part that covers the top of the casing 151 of the cover part 161 is exposed to the outside of the dust collector 100, and the other part is formed inside the dust collector 100. The air discharge part 162 is formed in the other part. Only a region in which the air discharge part 162 is formed is opened to discharge air while the other region is blocked by the cover part 161.

The air discharge part 162 protrudes from the cover part 161 and inserted into the vortex finder 190 and configured to discharge air from which fine dust has been separated from the cyclones. The air discharge part 162 has a shape forming the circumference of a hollow part, and air is discharged through the hollow part.

Next, the second dust collection part 104 will be described. The second dust collection part 104 is formed by the partition plate 126, the inner case 120, and the lower cover 130. The partition plate 126 forms an upper wall of the second dust collection part 104. The inner case 120 forms a side wall of the second dust collection part 104. The lower cover 130 forms the bottom of the second dust collection part 104.

The inclined surface 121g is formed inside of the first member 121. The inclined surface 121g is provided at a height corresponding to the inclined part 121a. In this case, the outside and the inside of the first member 121 may be understood as the inclined part 121a and the inclined surface 121g, respectively. The inclined surface 121g is provided equal to the same number of cyclones, and each of the same number of inclined surfaces 121g are provided below the fine dust vent 154. Fine dust discharged through the fine dust vent 154 falls down along the inclined surface 121g and is collected by the second dust collection part 104. As described above, a wall is formed between the inclined surfaces 121g as a boundary therebetween.

The vertical extension part 121c of the first member 121 and the stepped part 122b, the inclined part 122c, and the dust collection part boundary 122d of the second member 122 form the side wall of the second dust collection part 104. The dust collection part boundary 122d has a hollow cylindrical shape, and the bottom of the dust collection part boundary 122d is in close contract with the lower cover 130. Thus, the dust collection part boundary 122d forms the boundary between the first dust collection part 103 and the second dust collection part 104. A first dust collection part 103 having a ring-shaped cross section is formed outside the dust collection part boundary 122d, and a second dust collection part 104 having a circular cross section is formed inside the dust collection part boundary 122d.

As the lower cover 130 is rotated by the hinge 131, the first dust collection part 103 and the second dust collection part 104 may be simultaneously opened. When the first dust collection part 103 and the second dust collection part 104 are simultaneously opened by the lower cover 130 being rotated by the hinge 131, dust collected by the first dust collection part 103 and fine dust collected by the second dust collection part 104 may be simultaneously discharged. Since dust and fine dust are simultaneously discharged only by a one-time operation of opening the lower cover 130, it is possible to enhance user convenience for the dust collector 100 or the vacuum cleaner.

Subsequently, the other elements of the dust collector 100, which have not been described, will be described.

The filter 170 is installed above the cover member 160. The filter 170 is configured to filter out ultra-fine dust that has not been filtered out by the primary cyclone part 101 and the secondary cyclone part 102. The filter 170 may be formed in the shape of a block and is fixed by the filter fixing part 180. The filter fixing part 180 is configured to cover the filter 170, and an air through hole 181 is formed in the filter fixing part 180 to pass air.

Next, an operation of the dust collector 100 will be described. Because of a suction force generated by the suction motor of the vacuum cleaner 1, air and foreign substances flow into the inlet 111 of the dust collector 100 through the suction part 20 (see FIG. 1). While the air having flowed into the inlet 111 of the dust collector 100 flows along a flow path, the air is sequentially filtered through the primary cyclone part 101 and the secondary cyclone part 102 and discharged through the outlet 141. Dust and fine dust separated from the air are collected by the dust collector 100.

More specifically with respect to the process of separating dust from air by the primary cyclone part 101, air and foreign substances flow into an annular space between the outer case 110 and the inner case 120 through the inlet 111 of the dust collector and swirl in the annular space. In this process, relatively heavy dust gradually flows downward while swirling in a space between the outer case 110 and the inner case 120 in a spiral shape because of a centrifugal force and is collected by the first dust collection part 103.

Air and fine dust are lighter than dust, and thus pass through the mesh filter 125 by a suction force. Next, the air and the fine dust pass through the connection flow paths 124a and 124b and the hollow part 150' of the casing member 150. The air and the fine dust flow into the cyclones of the secondary cyclone part 102 through the inlet flow path 150".

The air and fine dust are guided at low speed in an inclined direction by the inlet flow path 150" and then swirl at high speed along the guide vane 195. The fine dust, which is heavier than the air, gradually flows downward while swirling between the casing 151 and the vortex finder 190 and is discharged to the fine dust vent 154 and collected by the second dust collection part 104. The air, which is lighter than the fine dust, is discharged through an inner side of the vortex finder 190 and discharged to the outlet 141 through the filter 170. Ultra-fine dust is filtered out by the filter 170.

Inlet flow paths 150" of the cyclones constituting the secondary cyclone part 102 will be described below. The inlet flow paths 150" will be described with reference to FIG. 5 again and also FIG. 6. FIG. 5 is a partial perspective view of the dust collector 100 shown in FIG. 3. FIG. 6 is a plane view of the casing member 150 and the vortex finder 190.

The inlet flow paths 150" are formed by the casing member 150. The inlet flow paths 150" of the cyclones are arranged along the hollow part 150' of the casing member 150. Each of the inlet flow paths 150" corresponds to a flow path through which air and fine dust that sequentially have passed through the primary cyclone part 101 and the connection flow paths 124a and 124b flow into the cyclones of the secondary cyclone part 102.

The inlet flow paths 150" according to the present disclosure are configured to form directionality of flow into each cyclone. As shown in FIGS. 5 and 6, the vortex finder 190 is provided at the center of each of the casings 151, and the inlet flow paths 150" are configured to enable air to flow in a direction eccentric from the center of the vortex finder 190. To this end, the inlet flow paths 150" are formed in a direction D2 inclined with respect to a direction D1 toward the center of the vortex finder 190.

The casing member 150 includes inlet flow path forming parts 156 and 157 to form the inlet flow paths 150" that are toward the inclined direction. The inlet flow path forming parts 156 and 157 may be described on the basis of the casing member 150 and the boundary part (or wall) 155.

The boundary part 155 extends from outer circumferences of the cyclones to the center O of the casing member 150 to form a boundary between the cyclones. Since the cyclones are arranged in a circular shape, the boundary part 155 is formed at both sides of each of the cyclones. Also, since the boundary part 155 extends to the center O of the casing member 150, a distance between the first boundary part (or leading boundary part or wall) 155a positioned at one side and the second boundary part (or trailing boundary part or wall) 155b positioned at the other side gradually decreases toward the center O of the casing member 150. Conversely, the distance between the first and second boundary parts 155a and 155B gradually increases toward the vortex finder 190.

The boundary part 155 is connected to a top border 158 of the casing 151. The top border 158 of the casing 151 is configured to partially surround the top of the vortex finder 190 at a position spaced apart from the vortex finder 190. The top border 158 of the casing 151 corresponds to a part exposed to the outer appearance of the dust collector 100. The vortex finder 190 is surrounded by the top border 158, the first and second boundary parts 155a and 155b, and the inlet flow path forming parts (or extensions) 156 and 157.

The inlet flow path forming parts 156 and 157 protrude from at least one of the first and second boundary parts 155a and 155b to form the inlet flow path 150" to be inclined. For example, the inlet flow path forming parts 156 and 157 may protrude from the first boundary part 155a, the second boundary part 155b, or the first and second boundary parts 155a and 155b.

The inlet flow path forming parts 156 and 157 make a sectional area at any position of the inlet flow path 150" smaller than at a start position of the inlet flow path 150". In FIG. 5, the sectional area at the start position of the inlet flow path 150" is indicated by numeral reference A. Also, in FIG. 5, the sectional area at any position of the inlet flow path 150" is indicated by numeral reference B.

Like an area being expressed by the product of width and height, a sectional area of the inlet flow path 150" may be expressed by the product of distance and height. The height of the inlet flow path 150" is constant irrespective of position. Accordingly, the size of the sectional area is determined by comparing distances with each other.

Referring to FIG. 6, the sectional area at the start position of the inlet flow path 150" corresponds to the product of height and distance indicated by A-A. Also, the sectional area at any position of the inlet flow path 150" corresponds to the product of height and distance indicated by B-B. Here, the height denotes the height of the inlet flow path 150". The distance indicated by A-A was measured on the basis of what is parallel to a line that connects end points (points closest to the center of the casing 151) of the first and second boundary parts 155a and 155b, and the distance indicated by B-B was measured on the basis of what is parallel to the distance indicated by A-A.

Since the height of the inlet flow path 150" is constant and the distance indicated by A-A is shorter than the distance indicated by B-B, the sectional area at any position of the inlet flow path 150" is smaller than the sectional area at the start position of the inlet flow path 150". Since the distance between the first and second boundary parts 155a and 155b progressively shorten toward the center of the casing 151, the sectional area should progressively widen away from the center of the casing 151. However, since the inlet flow path forming parts 156 and 157 protrude from the boundary part 155 in order to set directionality of an inlet flow, the sectional area progressively narrows away from the center of the casing 151. As a result, the sectional area is smaller at any position of the inlet flow path 150" than at the start position of the inlet flow path 150".

The inlet flow path forming parts 156 and 157 include a first forming part 156 and a second forming part 157. The first forming part 156 protrudes from the first boundary part 155a, which is one of the first boundary part 155a and the second boundary part 155b, and includes a first surface 156a and a second surface 156b.

The first surface 156a is configured to surround the vortex finder 190 along with the casing 151 at a position separated apart from the vortex finder 190. The first surface 156a is formed on the top of the casing 151 like the top border 158 of the casing member 150. Also, the first surface 156a may be curved to surround the vortex finder 190.

A boundary between the first surface 156a and the top border 158 of the casing 151 is shown in FIG. 5. However, the boundary between the first surface 156a and the top border 158 may not necessarily be present. Referring to FIG. 6, for example, as the top border 158 and the first surface 156a have the same curvature, there is no boundary between the top border 158 and the first surface 156a.

The second surface 156b extends in the direction D2 inclined from the start position of the inlet flow path 150" and reaches the first surface 156a at an edge 156c. In order to enable air to flow in the direction eccentric from the center of the vortex finder 190, it is preferable that the edge 156c be provided above the inner circumferential surface of the casing 151. FIG. 6 shows that the edge 156c is provided above the inner circumferential surface of the casing 151.

The second forming part 157 protrudes from the second boundary part 155b, which is one of the first boundary part 155a and the second boundary part 155b, and includes a first surface 157a and a second surface 157b. The description of the first surface 156a and the second surface 156b of the first forming part 156 may be applied to the first surface 157a and the second surface 157b of the second forming part 157.

The first surface 157a is configured to surround the vortex finder 190 along with the casing 151 at a position separated apart from the vortex finder 190. The first surface 157a is formed on the top of the casing 151 like the top border 158 of the casing member 150. Also, the first surface 157a may be curved to surround the vortex finder 190.

A boundary between the first surface 157a and the top border 158 of the casing 151 is shown in FIG. 5. However, the boundary between the first surface 157a and the top border 158 may not necessarily be present. Referring to FIG. 6, for example, as the top border 158 and the first surface 157a have the same curvature, there is no boundary between the top border 158 and the first surface 157a. The first surface 156a of the first forming part 156 and the first surface 157a of the second forming part 157 surround different portions of the vortex finder 190 at different positions.

The second surface 157b extends in the direction D2 inclined from the start position of the inlet flow path 150" and reaches the first surface 157a at an edge 157c. In order to enable air to flow in the direction eccentric from the center of the vortex finder 190, it is preferable that the edge 157c be provided above the inner circumferential surface of the casing 151.

FIG. 6 shows that the edge 157c is provided above the inner circumferential surface of the casing 151. The second surface 156b of the first forming part 156 and the second surface 157b of the second forming part 157 may not be parallel to each other, but are provided to face each other in order to form the inlet flow path 150" to be inclined.

The second surface 156b of the first forming part 156 has an acute angle $\theta 1$ from a tangential line at the start position of the inlet flow path 150". Also, the second surface 156b of the second forming part 157 has an obtuse angle $\theta 2$ from another tangential line at the start position of the inlet flow path 150". The reason the second surface 156b of the first forming part 156 and the second surface 157b of the second forming part 157 have the acute angle $\theta 1$ and the obtuse angle $\theta 2$, respectively, is to form the inlet flow path 150" to be inclined.

In order to form the inlet flow path 150" to be inclined, the first forming part 156 is necessarily required, but the second forming part 157 is not necessarily required. For example, even when the first forming part 156 protrudes from the first boundary part 155a and the second forming part 157 is not present in the second boundary part 155b, the inlet flow path 150" may be formed to be inclined by the first forming part 156 and the second boundary part 155b. This is because the second boundary part 155b extends in an inclined direction. Accordingly, the inlet flow path forming parts 156 and 157 forming the inlet flow path 150" to be inclined is a concept including forming the inlet flow path 150" to be inclined by only using the first forming part 156.

Each of the cyclones includes a first region R1 and a second region R2 that are formed between the inner circumferential surface of the casing 151 and the outer circumferential surface of the vortex finder 190. The first region R1 and the second region R2 are regions where the guide vane 195 is provided. The first region R1 is positioned in a direction eccentric from the center of the vortex finder 190. Here, the eccentric direction is a direction in which air and fine dust flow, as described above. The second region R2 is positioned opposite to the first region R1 with respect to the vortex finder 190. The second region R2 is also eccentric from the center of the vortex finder 190, but air and fine dust do not flow into the second region R2.

The inlet flow path forming parts 156 and 157 protrude up to a position where air may flow into the first region R1 and may be blocked from flowing into the second region R2. A virtual line that extends from the center O of the casing member 150 to an outer circumferential surface 191' at the side of the second region R2 of the vortex finder 190 may be expressed as reference numeral S. The first forming part 156, which is one of the inlet flow path forming parts 156 and 157, protrudes up to a position that reaches or exceeds the virtual line S. FIG. 6 shows that the edge 156c of the first forming part 156 reaches the virtual line S.

A representative flowing direction of air may be described on the basis of the virtual line S extending from the center O of the casing member 150. When the first forming part 156 protrudes up to a position that falls below the virtual line S, air flows into the second region R2. This is because air may flow in between the virtual line S and the first forming part 156. Conversely, when the first forming part 156 protrudes up to a position that reaches or exceeds the virtual line S, air flows only into the first region R1. This is because air does not flow in between the virtual line S and the first forming part 156 or only extremely tiny air flows into the second region R2.

Also, a position from which the first forming part 156 protrudes may be described on the basis of the edge 156c of the first forming part 156. When a normal line length from a point of the boundary part 155 to the edge 156c of the first forming part 156 is greater than or equal to a normal line length from the point of the boundary part 155 to the virtual line S, the first forming part 156 protrudes up to a position that reaches or exceeds the virtual line S. FIG. 6 shows that a normal line length l from a point of the boundary part 155 to the edge 156c of the first forming part 156 is equal to a normal line length l from the point of the boundary part 155 to the virtual line S.

The above-described sectional area at the start position of the inlet flow path 150" may be called a first sectional area A. Also, the smallest sectional area among sectional areas between the second forming part 157 and the edge 156c of the first forming part 156 may be called a second sectional area B'. The sectional area corresponds to one of sectional areas B at any positions of the inlet flow path 150".

In this case, a size of the second sectional area may be equal to one-half to one-third of a size of the first sectional area. This means that the inlet flow path forming parts 156 and 157 reduce a sectional area between the first and second boundary parts 155a and 155b by one-third to one-half.

The size of the second sectional area being reduced denotes that the inlet flow path forming parts 156 and 157 further protrude from one side or the other side of the boundary part 155. When the inlet flow path forming parts 156 and 157 protrude from the boundary part 155 to the extent to which the second sectional area has a size equal to one-half to one-third of the size of the first sectional area, the inlet flow path 150", the inlet flow path 150" may be formed in an inclined direction.

By the above-described structure of the inlet flow path 150", air and fine dust that have flowed into each cyclone flow not into the second region R2 but into the first region R1. The inlet flow path 150" formed in an inclined direction is configured to guide a direction of revolution of air before a swirling flow is formed by the guide vane 195. Accordingly, the air and fine dust that have flowed into each cyclone are provided with low rotatability before reaching the guide vane 195.

The guide vane 195 generates a swirling flow for the air and fine dust provided with rotatability. A guide vane 195a, which is provided in the first region R1 among such guide vanes 195, gradually shortens in a spiral direction away from the inlet flow path 150". Also, a guide vane 195b, which is provided in the second region R2 among such guide vanes 195, gradually shortens in a spiral direction toward the inlet flow path 150". As described above, the guide vane 195 has a structure interoperable with the structure of the inlet flow path 150" that provides rotatability.

The guide vane 195 generates a fast revolving flow. A cyclone in which only the guide vane 195 is provided without the inclined inlet flow path 150" or a cyclone into which air flows in a tangential direction may generate a fast but uniform revolving flow. However, when a flow is guided from the first region R1 by the inclined structure of the inlet flow path 150" according to the present disclosure, a uniform revolving flow may also be generated in the guide vane 195, and thus a loss of the flow is reduced.

Figure 7:
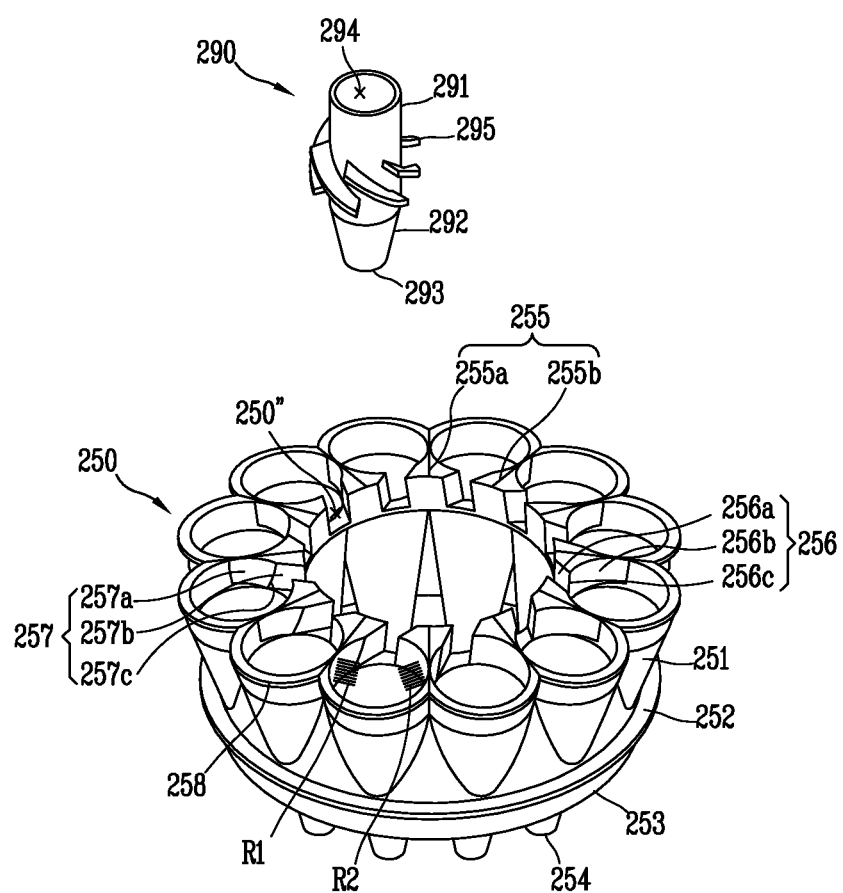
FIG. 7 is a perspective view of a casing member and a vortex finder according to another embodiment of the present disclosure.
Figure 8:
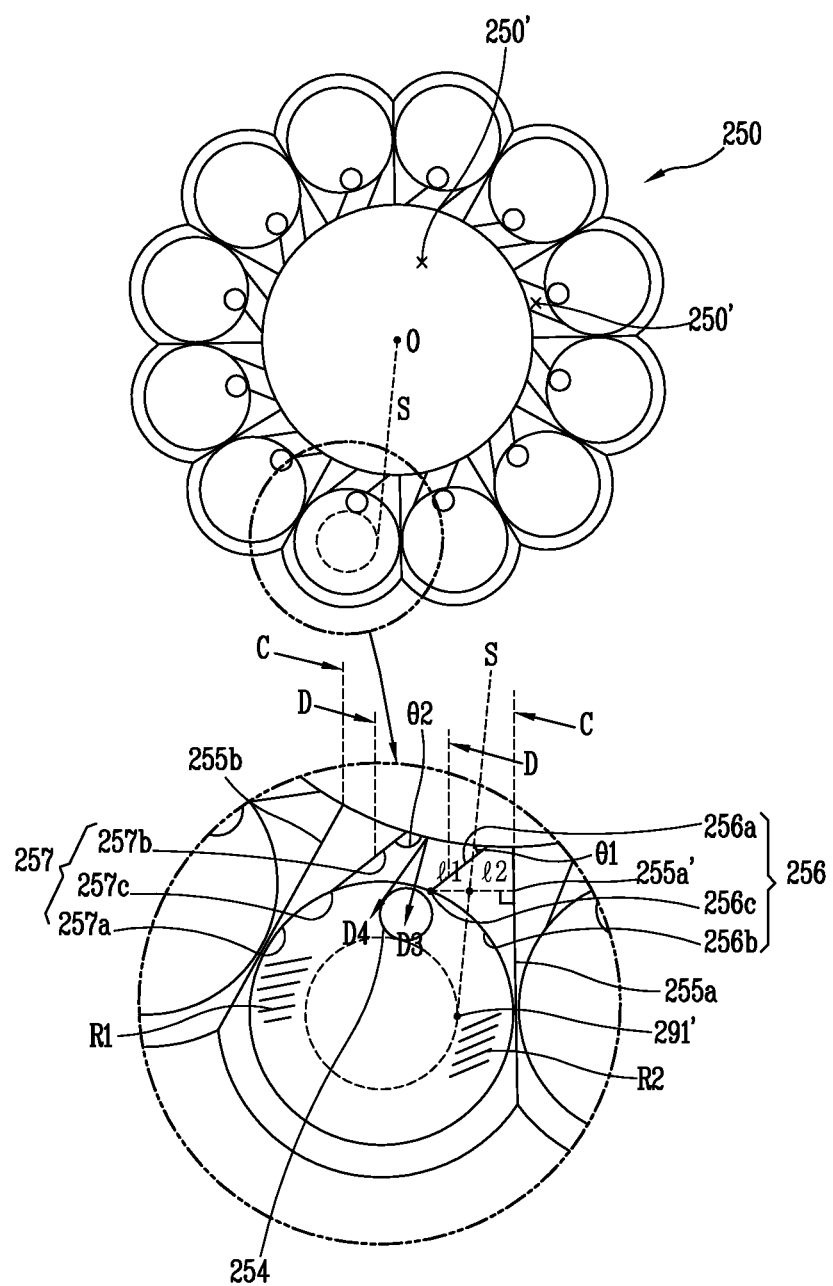
FIG. 8 is a plan view of a casing member shown in FIG. 7.

Another embodiment of the present disclosure will be described below. FIG. 7 is a perspective view of the casing member 250 and a vortex finder 290 according to another embodiment of the present disclosure. FIG. 8 is a plan view of the casing member 250 shown in FIG. 7.

The casing member 250 and the vortex finder 190 have structures that are essentially similar to that of the above-described embodiment. However, the first forming part 256 and the second forming part 257 have a little difference in terms of a protruding degree. Accordingly, the redundant description will be omitted herein.

The vortex finder 290 is configured to form an outer wall surrounding a hollow part. The vortex finder 190 may be classified into an upper portion and a lower portion. The upper portion of the vortex finder 290 may have an outer diameter that is constant or increases upward. The lower portion of the vortex finder 290 may have an outer diameter that decreases downward.

Since the upper portion of the vortex finder 290 has a greater outer diameter than the lower portion of the vortex finder 290, it is possible to increase a rate of flow into each cyclone. Also, since the lower portion of the vortex finder 290 has an outer diameter that gradually decreases downward, it is possible to block fine dust from being discharged to the vortex finder 290.

The guide vane 295 is formed to protrude from an outer circumferential surface of the vortex finder 290. The guide vanes 295 extend in a spiral direction, and the guide vanes 295 have the same direction of extension. The direction of extension may be described differently depending on positions where the guide vanes 295 are provided. The guide vane 295 provided in the first region R1 gradually shortens in a spiral direction away from the inlet flow path 250", and the guide vane 295 provided in the second region R2 gradually shortens in a spiral direction toward the inlet flow path 250".

The inlet flow path 250" is configured to enable air to flow in a direction eccentric from the center of the vortex finder 290. To this end, the inlet flow path 250" is formed in a direction D4 inclined with respect to a direction D3 toward the center of the vortex finder 290.

The inlet flow path forming parts 256 and 257 make a sectional area at any position of the inlet flow path 250" smaller than at the start position of the inlet flow path 250". Like an area being expressed by the product of width and height, a sectional area of the inlet flow path 250" may be expressed by the product of distance and height. The height of the inlet flow path 250" is constant irrespective of position. Accordingly, the size of the sectional area is determined by comparing distances with each other.

Referring to FIG. 8, the sectional area at the start position of the inlet flow path 250" corresponds to the product of height and distance indicated by C-C. Also, the sectional area at any position of the inlet flow path 250" corresponds to the product of height and distance indicated by D-D. Here, the distance corresponds to the height of the inlet flow path 250". The distance indicated by C-C was measured on the basis of what is parallel to a line that connects end points (points closest to the center of the casing 251) of the first and second boundary parts 255a and 255b, and the distance indicated by D-D was measured on the basis of what is parallel to the distance indicated by C-C.

Since the height of the inlet flow path 250" is constant and the distance indicated by C-C is shorter than the distance indicated by D-D, the sectional area at any position of the inlet flow path 250" is smaller than the sectional area at the start position of the inlet flow path 250". Since the distance between the first and second boundary parts 255a and 255b progressively shortens toward the center of the casing 251, the sectional area should progressively widen away from the center of the casing 251. However, since the inlet flow path forming parts 256 and 257 protrude from the boundary part 255 in order to set directionality of an inlet flow, the sectional area progressively narrows away from the center of the casing 251. As a result, the sectional area is smaller at any position of the inlet flow path 250" than at the start position of the inlet flow path 250".

The inlet flow path forming parts 256 and 257 include a first forming part 256 and a second forming part 257. The first forming part 256 protrudes from the first boundary part 255a, which is one of the first and second boundary parts 255a and 255b, and includes a first surface 256a and a second surface 256b. The second forming part 257 protrudes from the boundary part 255b, which is one of the first and second boundary parts 255a and 255b, and includes a first surface 257a and a second surface 257b.

FIG. 8 shows that an edge 256c of the first forming part 256 and an edge 257c of the second forming part 257 are provided above the inner circumferential surface of the casing 251. The second surface 256b of the first forming part 256 and the second surface 257b of the second forming part 257 may not be parallel to each other, but are provided to face each other in order to form the inlet flow path 250" to be inclined.

The second surface 256b of the first forming part 256 has an acute angle θ1 from a tangential line at the start position of the inlet flow path 250". Also, the second surface 257b of the second forming part 257 has an obtuse angle θ2 from another tangential line at the start position of the inlet flow path 250". The reason the second surface 256b of the first forming part 256 and the second surface 257b of the second forming part 257 have the acute angle θ1 and the obtuse angle θ2, respectively, is to form the inlet flow path 250" to be inclined.

The acute angle θ1 shown in FIG. 8 is smaller than the acute angle θ2 shown in FIG. 6. This is because the first forming part 256 shown in FIG. 8 protrudes from the first boundary part 255a more than the first forming part 256 shown in FIG. 6.

The obtuse angle θ2 shown in FIG. 8 is greater than the obtuse angle θ2 shown in FIG. 6. This is because the second forming part 257 shown in FIG. 8 protrudes from the second boundary part 255b more than the second forming part 257 shown in FIG. 6.

The inlet flow path forming parts 256 and 257 protrude up to a position where air may flow into the first region R1 and may be blocked from flowing into the second region R2. A virtual line that extends from the center O of the casing member 250 to an outer circumferential surface at the side of the second region R2 of the vortex finder 290 may be expressed as reference numeral S. The first forming part 256, which is one of the inlet flow path forming parts 256 and 257, protrudes up to a position that reaches or exceeds the virtual line S. FIG. 8 shows that the edge 256c of the first forming part 256 exceeds the virtual line S.

The possibility of air flowing into the second region R2 decreases more by a structure in which the first forming part 256 protrudes over the virtual line S than by the structure of FIG. 6. Accordingly, a flow of air may be guided only to the first region R1 by adjusting a degree of protrusion of the first forming part 256.

A representative flowing direction of air may be described on the basis of the virtual line S extending from the center O of the casing member 250. When the first forming part 256 protrudes up to a position that falls below the virtual line S, air flows into the second region R2. This is because air may flow in between the virtual line S and the first forming part 256.

When a normal line length from a point of the boundary part 255 to the edge 256c of the first forming part 256 is greater than or equal to a normal line length from the point of the boundary part 255 to the virtual line S, the first forming part 256 protrudes up to a position that reaches or exceeds the virtual line S. FIG. 8 shows that a normal line length l1+l2 from a point of the boundary part 255 to the edge 256c of the first forming part 256 is greater than a normal line length l2 from the point of the boundary part 255 to the virtual line S.

The dust collector and the vacuum cleaner having the same that have been described above are not limited to the configurations and methods of the above-described embodiments, and various modifications to the embodiments may be made by selectively combining all or some of the embodiments.

According to the present disclosure, since the inlet flow path of each cyclone formed by the casing member is inclined to enable air to flow in the direction eccentric from the center of the vortex finder, directionality may be assigned to air flowing into each cyclone. In particular, since the inlet flow path forming part protrudes up to a position that exceeds a virtual line extending from the center of the casing member to the outer circumferential surface of the second region of the vortex finder, directionality of an air flow may be assigned to a first region of each cyclone, and a flow of air to a second region is not formed. Through such a structure, it is possible to form a uniform flow in each cyclone.

Also, the present disclosure has a structure in which a guide vane provided in the first region gradually shortens in a spiral direction or a direction of revolution away from the inlet flow path and a guide vane provided in the second region gradually shortens in a spiral direction or a direction of revolution toward the inlet flow path. This structure may induce a fast revolving flow by using directionality of air formed by the inlet flow path. Accordingly, the present disclosure may primarily form a uniform flow in a cyclone by guiding a flow of air through a structure of the inlet flow path and secondarily form a fast revolving flow through the guide vane, and thus may have advantages of a tangential inflow cyclone and an axial cyclone.

Therefore, an aspect of the detailed description is to provide a dust cleaner and a vacuum cleaner that include a cyclone having a structure for primarily guiding a flow of air to form a uniform flow in the cyclone and secondarily forming a fast revolving flow. Another aspect of the detailed description is to provide a dust cleaner and a vacuum cleaner that include a cyclone having a structure for guiding a flow of air into the cyclone in a direction eccentric from the center of the cyclone to induce a uniform revolving flow. Still another aspect of the detailed description is to provide a cyclone having a fast revolution inducing structure interoperable with an eccentric guide structure to cause air guided in a direction eccentric from the center of the cyclone to revolve at high speed, and a dust collector and a vacuum cleaner that have the cyclone.

To achieve these and other aspects and in accordance with this specification, as embodied and broadly described herein, there is provided a dust collector having a multi-cyclone structure composed of a primary cyclone part and a secondary cyclone part. The primary cyclone part is configured to separate dust from air, and the secondary cyclone part configured to separate fine dust from air that has passed through the primary cyclone part. The secondary cyclone part includes a set of cyclones configured to separate fine dust from air.

The secondary cyclone part is formed by coupling a casing member and vortex finders. The casing member forms casings of the cyclones. The vortex finders are provided inside the casings and include guide vanes extending in a spiral direction and forming a revolving flow at outer circumferential surfaces.

The casing member forms inlet flow paths of the cyclones. Each of the inlet flow paths is formed in a direction inclined with respect to a direction toward a center of each of the vortex finders to enable air to flow in a direction eccentric from the center of each of the vortex finders.

The casing member includes a boundary part and a flow path forming part. The boundary part extends from an outer circumference of each of the cyclones to the center of the casing member to form a boundary between the cyclones. The boundary part may include a first boundary part formed at one side of each of the cyclones and a second boundary part formed at the other side, and a distance between the first and second boundary parts gradually decreases toward the center of the casing member.

The inlet flow path forming part protrudes from at least one of the first and second boundary parts to the other boundary part to form an inlet flowing path in the inclined direction. The inlet flow path forming part partially blocks the inlet flow path to make a sectional area smaller at any position of the inlet flow path than at a start position of the inlet flow path. The inlet flow path forming part decreases a sectional area between the first and second boundary parts by a third to a half.

The inlet flow path forming part includes a first surface and a second surface. The first surface surrounds a portion of the vortex finder together with the casing at a position spaced apart from the vortex finder. The second surface extends from the start position of the inlet flow path in the inclined direction and meets the first surface at an edge. The inlet flow path starts from a circumference of a hollow part of the casing member, and the second surface of the inlet flow path forming part forms an acute angle from a tangential line at the start position of the inlet flow path.

Each of the cyclones of the secondary cyclone part includes a first region and a second region that are formed between an inner circumferential surface of the casing and an outer circumferential surface of the vortex finder. The first region is positioned in the eccentric direction or the inclined direction, and the second region is positioned opposite to the first region with respect to the vortex finder.

The inlet flow path forming part protrudes up to a position that reaches or exceeds a virtual line extending from the center of the casing member to an outer circumferential surface at the side of the second region of the vortex finder. A normal line length from a point of the boundary part to the edge is greater than or equal to a normal line length from the point to the virtual line.

The inlet flow path forming part may include a first forming part and a second forming part. The first forming part protrudes from the first boundary part, and the second forming part protrudes from the second boundary part. Each of the first forming part and the second forming part includes a first surface and a second surface that meet each other at the edge.

A guide vane provided in the first region among the guide vanes gradually shortens in a spiral direction away from the inlet flow path; and a guide vane provided in the second region among the guide vanes gradually shortens in a spiral direction toward the inlet flow path. Also, the present disclosure provides a vacuum cleaner including the dust collector.

In one embodiment, the present disclosure provides a dust collector comprising: a first cyclone body formed by an outer case having a hollow shape and an inner case provided inside the outer case, the first cyclone body forming a first cyclone to separate contaminants from air received from outside the dust collector; and a second cyclone body forming a set of second cyclones to separate contaminants from air that has passed through the first cyclone body, wherein the second cyclone body includes: a shell casing mounted on the inner case, the shell casing including a hollow region and casings for the second cyclones that are positioned around the hollow region; and vortex finders provided inside the casings, the vortex finders including hollow bodies and guide vanes extending in a spiral direction around the hollow bodies, wherein the shell casing further includes inlet flow paths extending from the hollow region to the casings, and each of the inlet flow paths is formed in an eccentric direction relative to a center of corresponding one of the vortex finders positioned in the casings.

In another embodiment, the present disclosure provides a dust collector comprising: a first cyclone body to receive air from outside the dust collector to form a first vortex to remove first contaminants; and a second cyclone body including: a hollow region to receive air from the first cyclone body, inlet flow paths extending from the hollow region to receive air from the hollow region, casings having inverted cone shapes and receiving air from the inlet flow paths, and vortex finders provided inside the casings, the vortex finders including hollow bodies and guide vanes extending in a spiral direction around the hollow bodies to form second vortexes within the casings to remove second contaminants.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum cleaner comprising a dust collector; wherein the dust collector comprising:
    a first cyclone body formed by an outer case having a hollow shape and an inner case provided inside the outer case, the first cyclone body forming a first cyclone to separate contaminants from air received from outside the dust collector; and
    a second cyclone body forming a set of second cyclones to separate contaminants from air that has passed through the first cyclone body,
    wherein the second cyclone body includes:
        a shell casing mounted on the inner case, the shell casing including casings of the second cyclones that are positioned around a hollow region; and
        vortex finders provided inside the casings, the vortex finders including hollow bodies and guide vanes extending in a spiral direction around the hollow bodies, and
    wherein:
        the shell casing further includes inlet flow paths extending from the hollow region to the casings, and each of the inlet flow paths is formed in an eccentric direction relative to a center of a corresponding one of the vortex finders positioned in the casings;
        each of the second cyclones includes a first region and a second region that are formed between an inner circumferential surface of a corresponding one of the casings and an outer circumferential surface of a corresponding one of the vortex finders;
        the first region is positioned in the eccentric direction;
        the second region is positioned opposite to the first region with respect to the center of the vortex finder;
        the guide vanes for each of the vortex finders includes a first guide vane provided in the first region that gradually shortens in a spiral direction away from a corresponding one of the inlet flow paths, and a second guide vane provided in the second region that gradually shortens in a spiral direction toward the corresponding one of the inlet flow paths;
        the second cyclones are positioned in contact with and around the hollow region;
        the shell casing further includes boundary walls extending from outer circumferences of each of the second cyclones toward the hollow region to form a boundary between the second cyclones, and inlet flow path forming extensions protruding from one or more surfaces of the boundary walls to form the inlet flow paths in the eccentric direction;
        for each of the flow paths, the inlet flow path forming extensions include a first forming extension protruding from a leading one the boundary walls, and a second forming extension protruding from a trailing one of the boundary walls;
        each of the first forming extensions and the second forming extensions includes a first surface adjacent to a portion of a corresponding one of the vortex finders and the associated casing, and a second surface extending from a start position of the inlet flow path and meeting the first surface at an edge;
        the hollow region of the shell casing is formed at a center of the shell casing;
        the inlet flow path starts from a circumference of the hollow region;
        the second surface of the first forming extension forms an acute angle with a first line tangential to the circumference of the hollow region at the start position of the inlet flow path; and
        the second surface of the second forming extension forms an obtuse angle with a second line tangential to the circumference of the hollow region at the start position of the inlet flow path.

2. The vacuum cleaner of claim 1, wherein a distance between adjacent pairs of the boundary walls associated with respective ones of the flow paths progressively increases between a start position of the flow path adjacent to the center region and an end position of the flow path adjacent to an associated one of the vortex finders, such that the cross-sectional areas of the inlet flow paths perpendicular to air flows in the inlet flow paths decrease between the start positions and the end positions.

3. The vacuum cleaner of claim 2, wherein the cross-sectional areas of the inlet flow paths decrease by a third to a half between the start positions adjacent to the hollow region and the end positions adjacent to the vortex finder.

4. The vacuum cleaner of claim 1, wherein the inlet flow path forming extension protrudes up to or beyond a virtual line extending from a center of the shell casing to an outer circumferential surface at a side of a region of the vortex finder positioned away from the center of the vortex finder in a direction that is opposite to the eccentric direction.

5. The vacuum cleaner of claim 4, wherein:
    a normal line extends from a point in the boundary wall toward the edge, and a first length of the normal line from the point to the edge is greater than or equal to a second length of the normal line from the point to the virtual line.

6. The vacuum cleaner of claim 1, wherein:
    a distance between the first and second boundary walls progressively increase between the start position and an end position of the inlet flow path adjacent to the vortex finder; and
    the first forming extension and the second forming extension are configured such that cross-section areas perpendicular to air flow between the first and second boundary extensions away from the start position are smaller than a cross-section area perpendicular to air flow at the start position of the inlet flow path.

7. The vacuum cleaner of claim 1, wherein the first forming extension and the second forming extension are configured such that cross-section sectional areas perpendicular to air flow between the first and second boundary walls decrease by a third to a half between the start positions adjacent to the hollow region and end positions adjacent to the vortex finder.

8. The vacuum cleaner of claim 1, wherein the first forming extension protrudes to a position that reaches or exceeds a virtual line extending from the center of the shell casing to an outer circumferential surface at a side of a region of the vortex finder positioned away from a center of the vortex finder in a direction that is opposite to the eccentric direction.

9. The vacuum cleaner of claim 8, wherein a normal line extends from a point in the first boundary wall toward the edge, a first length of the normal line from the point to the edge of the first forming extension is greater than or equal to a second length of the normal line from the point to the virtual line.

10. The vacuum cleaner of claim 1, wherein the second cyclone body is provided above the first cyclone body.

11. A vacuum cleaner comprising a dust collector; wherein the dust collector comprising:
   a first cyclone body to receive air from outside the dust collector to form a first vortex to remove first contaminants; and
   a second cyclone body including:
      a hollow region to receive air from the first cyclone body,
      inlet flow paths extending from the hollow region to receive air from the hollow region,
      casings having inverted cone shapes and receiving air from the inlet flow paths, and
      vortex finders provided inside the casings, the vortex finders including hollow bodies and guide vanes extending in a spiral direction around the hollow bodies to form second vortexes in the casing to remove second contaminants,
   wherein:
      each of the second cyclones includes a first region and a second region that are formed between an inner circumferential surface of a corresponding one of the casings and an outer circumferential surface of a corresponding one of the vortex finders;
      the first region is positioned in the eccentric direction;
      the second region is positioned opposite to the first region with respect to the center of the vortex finder;
      the guide vanes for each of the vortex finders includes a first guide vane provided in the first region that gradually shortens in a spiral direction away from a corresponding one of the inlet flow paths, and a second guide vane provided in the second region that gradually shortens in a spiral direction toward the corresponding one of the inlet flow paths;
      the second cyclones are positioned in contact with and around the hollow region;
      the shell casing further includes boundary walls extending from outer circumferences of each of the second cyclones toward the hollow region to form a boundary between the second cyclones, and inlet flow path forming extensions protruding from one or more surfaces of the boundary walls to form the inlet flow paths in the eccentric direction;
      for each of the flow paths, the inlet flow path forming extensions include a first forming extension protruding from a leading one the boundary walls, and a second forming extension protruding from a trailing one of the boundary walls;
      each of the first forming extensions and the second forming extensions includes a first surface adjacent to a portion of a corresponding one of the vortex finders and the associated casing, and a second surface extending from a start position of the inlet flow path and meeting the first surface at an edge;
      the hollow region of the shell casing is formed at a center of the shell casing;
      the inlet flow path starts from a circumference of the hollow region;
      the second surface of the first forming extension forms an acute angle with a first line tangential to the circumference of the hollow region at the start position of the inlet flow path; and
      the second surface of the second forming extension forms an obtuse angle with a second line tangential to the circumference of the hollow region at the start position of the inlet flow path.

12. The vacuum cleaner of claim 11, wherein a distance between adjacent pairs of the boundary walls associated with respective ones of the flow paths progressively increases between a start position of the flow path adjacent to the center region and an end position of the flow path adjacent to an associated one of the vortex finders, such that the cross-sectional areas of the inlet flow paths perpendicular to air flows in the inlet flow paths decrease between the start positions and the end positions.

13. The vacuum cleaner of claim 12, wherein the cross-sectional areas of the inlet flow paths decrease by a third to a half between the start positions adjacent to the hollow region and the end positions adjacent to the vortex finder.

14. The vacuum cleaner of claim 11, wherein the inlet flow path forming extension protrudes up to or beyond a virtual line extending from a center of the shell casing to an outer circumferential surface at a side of a region of the vortex finder positioned away from the center of the vortex finder in a direction that is opposite to the eccentric direction.

15. The vacuum cleaner of claim 14, wherein a normal line extends from a point in the boundary wall toward the edge, a first length of the normal line from the point to the edge is greater than or equal to a second length of the normal line from the point to the virtual line.

16. The vacuum cleaner of claim 11, wherein:
   a distance between the first and second boundary walls progressively increase between the start position and an end position of the inlet flow path adjacent to the vortex finder; and
   the first forming extension and the second forming extension are configured such that cross-section areas perpendicular to air flow between the first and second boundary extensions away from the start position are smaller than a cross-section area perpendicular to air flow at the start position of the inlet flow path.

17. The vacuum cleaner of claim 11, wherein the first forming extension and the second forming extension are configured such that cross-section sectional areas perpendicular to air flow between the first and second boundary walls decrease by a third to a half between the start positions adjacent to the hollow region and end positions adjacent to the vortex finder.

18. The vacuum cleaner of claim 11, wherein the first forming extension protrudes to a position that reaches or exceeds a virtual line extending from the center of the shell casing to an outer circumferential surface at a side of a region of the vortex finder positioned away from a center of the vortex finder in a direction that is opposite to the eccentric direction.

19. The vacuum cleaner of claim 18, wherein a normal line extends from a point in the first boundary wall toward the edge, a first length of the normal line from the point to the edge of the first forming extension is greater than or equal to a second length of the normal line from the point to the virtual line.

* * * * *